US006769986B2

(12) United States Patent
Vancura

(10) Patent No.: US 6,769,986 B2
(45) Date of Patent: Aug. 3, 2004

(54) METHODS FOR A CUSTOMIZED CASINO GAME

(75) Inventor: Olaf Vancura, Las Vegas, NV (US)

(73) Assignee: Mikohn Gaming Corporation, Las Vegas, NV (US)

( * ) Notice: Subject to any disclaimer, the term of this patent is extended or adjusted under 35 U.S.C. 154(b) by 0 days.

(21) Appl. No.: 09/965,165

(22) Filed: Sep. 26, 2001

(65) Prior Publication Data

US 2003/0060281 A1 Mar. 27, 2003

(51) Int. Cl.[7] ........................... A63F 13/00; A63F 9/24; G06F 17/00; G06F 19/00

(52) U.S. Cl. ........................................... 463/30; 463/20

(58) Field of Search ................................ 463/1, 13–25, 463/40–43, 30; 273/138.1

(56) References Cited

U.S. PATENT DOCUMENTS

| | | | | |
|---|---|---|---|---|
| 5,580,053 A | | 12/1996 | Crouch | |
| 6,068,552 A | * | 5/2000 | Walker et al. | 463/21 |
| 6,159,097 A | | 12/2000 | Gura | |
| 6,173,955 B1 | | 1/2001 | Perrie | |
| 6,190,255 B1 | | 2/2001 | Thomas | |
| 6,210,279 B1 | | 4/2001 | Dickinson | |
| 6,234,897 B1 | | 5/2001 | Frohm | |
| 6,254,481 B1 | | 7/2001 | Jaffe | |
| 6,293,866 B1 | * | 9/2001 | Walker et al. | 463/20 |
| 6,331,144 B1 | * | 12/2001 | Walker et al. | 463/20 |
| 6,471,207 B1 | * | 10/2002 | Schlaifer | 273/138.1 |
| 6,485,367 B1 | * | 11/2002 | Joshi | 463/13 |
| 6,503,146 B2 | * | 1/2003 | Walker et al. | 463/25 |
| 6,569,015 B1 | * | 5/2003 | Baerlocher et al. | 463/16 |

OTHER PUBLICATIONS

Trivial Pursuit Millennium Edition [Online] Nov. 30, 1999 [retrieved on Dec. 12, 2002]. Retrieved from the Internet: <URL:http://www.gamesdomain.com/gdreview/zones/reviews/pc/feb00/tp.html.*

* cited by examiner

*Primary Examiner*—Teresa Walberg
*Assistant Examiner*—Robert Mendoza
(74) *Attorney, Agent, or Firm*—Dorr, Carson, Sloan, Birney & Kramer, P.C.

(57) ABSTRACT

A method of customizing a casino game of chance has the steps of depicting to the player, before the base game, information about a plurality of aspects for playing the bonus game and allowing the player to pre-select one of the aspects before the bonus play. The step of basing the play of the bonus game upon the pre-selected aspect of the bonus game is a step. The method allows for a question and answer bonus game with choices of answers about trivia. The method has the step of choosing one of a plurality of categories for questions or the difficulty and/or monetary awards of the questions.

17 Claims, 4 Drawing Sheets

METHODS FOR A CUSTOMIZED CASINO GAME

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO A "MICROFICHE APPENDIX"

Not Applicable

BACKGROUND OF THE INVENTION

1. Field of the Invention

The present invention relates to casino games of chance and, in particular, to improvements in the methods of players being able to customize the bonus play of casino games on slot machines by pre-selection.

2. Description of Related Art Including Information Disclosed Under 37 CFR 1.97 and 1.98

Slot machines have become the most important contributor to revenue on casino floors. Among slot machines, those with a bonus game have become especially popular. Typically in these machines, a player plays the underlying game (sometimes referred to as the base game) with the usual pays for predefined combinations of symbols.

Occasionally, the player will qualify for a bonus game. This is usually triggered through the alignment of one or more special symbols (sometimes referred to as trigger symbols) as an event that initiates the bonus game. Hence, the bonus game is generally a somewhat rare and special occurrence that affords the player an opportunity to participate in an ancillary component of the slot machine with an associated award. Usually, no additional wager is required; the bonus game is an opportunity for the player to earn an additional award risk-free.

By use of the terms bonus game, there is intended no limitations to any particular form of bonus award. Rather, reference to a "bonus game" as one which is different than the traditional base game play, be that slot or table game or other game of chance. The bonus game may be housed separately from the slot reels (for example, in a spinning-reel slot machine with a top-box bonus), or may be simply on an additional screen (for example, in a video-reel slot machine). Too, for the purposes of the teachings herein, the manner and equipment that initiates a bonus game (e.g., combination of special symbols as described above or other methods) are varied in implementation.

There continues to be a need to enhance the bonus experience for slot machine players. In particular, players desire a feeling of control over the outcome of a bonus game. Typically, the feeling of control is in reality an illusion of control, as the player selects an object with a random award. Mathematically, the choice of object is not relevant to the overall expected value for the game.

Alternatively, in some bonus games, qualification occurs via an accumulation of something (e.g., symbols) in order to receive the award. In such games the astute player can choose a game wherein the accumulation has already begun such that the opportunity to win seems quicker.

IGT's game "Fortune Cookie" allows the player to touch an on-screen symbol which changes from "MSG" to "No MSG." Whether "MSG" or "No MSG" is selected does not affect game play.

Slots institute a process in which the player first qualifies (via trigger symbols) for a bonus game. In some slots a bonus game to be played is randomly selected before initiation of play of the randomly-chosen bonus game, e.g., WMS's game, "Money Grab" and "The Big Win" from Silicon Gaming.

U.S. Pat. No. 6,159,097 has a gaming machine wherein a bonus game includes a video-type display controlled by the processor and displaying a plurality of player-selectable elements, at least one of which represents a winning bonus game outcome. During bonus play, a player successively picks until the winning element is obtained. In response to the pick of the winning element, the bonus game awards the player a bonus payout. The value of the bonus payout successively decreases in response to the player successively picking the non-winning elements prior to picking the winning element.

U.S. Pat. No. 6,234,897 has the bonus game triggered in response to start-bonus symbols from the respective stopped reels appearing in the spinning reel display. The bonus game has different expected values based on different arrangements of the start-bonus symbols in the base game.

U.S. Pat. No. 6,254,481 has a base game with start-bonus outcome that may include a predetermined combination of trigger symbols on the reels. The linked image may illustrate an action. A first portion of the action may be shown on one of said displays and a second portion of the action may be shown on another of said displays. The action may be an object moving from one display to another display.

U.S. Pat. No. 6,190,255 has a gaming machine including a processor operable in a basic mode and a bonus mode for controlling game play. In the basic mode, the processor selects a basic game outcome from among a plurality of possible basic game outcomes. The possible basic game outcomes include a start-bonus outcome the occurrence of which causes the processor to shift operation from the basic mode to the bonus mode. The processor is operable to define a plurality of player-selectable bonus game outcomes. In the bonus mode, a player selects one or more of the bonus game outcomes and credits are awarded based upon which ones of the bonus game outcomes are selected.

U.S. Pat. No. 6,173,955 has a game with a bonus feature that includes strategy. The player plays a dice game for awards listed in a paytable. Dice to be held, or not held, must be decided upon, and the player's choices have a meaningful impact on the game's expected value.

BRIEF SUMMARY OF THE INVENTION

While the foregoing have attempted various methods of increasing player appeal and control, none of them satisfactorily gives the player control over the type of bonus game to be played. What is proposed herein is an entirely different approach in which the player customizes the play of the game. The player proactively chooses an aspect of the bonus game (such as, one of several games or one of several options within a game) preferably before initiating play on the base game, during play of the base game or at entry to bonus play.

Prior to initiating play on the base game, the player may choose one of a plurality of aspects for the play of the bonus game. For example, consider a bonus game in which the player will be asked a trivia question from one of six categories. In the approach taught herein, the category of trivia may be pre-selected (e.g., prior to or concurrently with wagering on the base game) by means of choices presented on a video touch screen. One manner in which this may be done is to have all six categories on-screen, see FIG. 1 or 2, and have the current category blinking. Blinking can not be shown on the FIG. 1 or 2. If the player wishes to change the category, he/she may touch one of the other categories, which instead would blink, and so forth. In a preferred embodiment, there is a color assigned to each category. After pre-selecting, preferably all of a special set of triggering, or qualification, symbols (on the reels) for that bonus game also modify (via different colors) to reflect the current selected category. In this manner, the player has customized the bonus game play, and is reminded of that fact while playing the base game. Thus, this video slot machine allows play of a pre-selected bonus game provided with questions directed to the player's customized pre-selection being a preferred or favorite category or subject.

In a more general form, the idea is implemented as follows. On the reels, there are special symbols that trigger the bonus game play. Prior to play of the base game, the player pre-selects the type of bonus game play that will be played. In a preferred embodiment, a touch-screen is used. In principle, the player may pre-select the type or any aspect of bonus game play. The pre-selection is depicted to the player during play of the base game, for example by modifying the reel symbols that trigger the bonus game to reflect the pre-selection.

A preferred embodiment is a video slot machine based on the Trivial Pursuit® home game, a Horn Abbot, Ltd. property. For a bonus game based on questions from the Trivial Pursuit® archives, the bonus play includes trivia and multiple choice answers, but the player may first pre-select the category of the trivia question that will be displayed. The preferred method has, as trigger symbols, "pie wedges" as may be found in the home game. The pie wedges are color-coded as to the categories, e.g. Red is Sports & Leisure but as shown in FIG. 1 the green areas of selection are shown in black and white with "SL" wherein the color Red would appear. Green is Science & Nature, likewise "SN" appears in FIG. 2 wherein the color red would appear, Blue is Geography, and so forth. When a new player sits down at the slot machine, he/she notices that the pie wedge symbols on the reels are Red. The player knows that if qualifying for this particular bonus (e.g., by aligning 3 or more pie wedge symbols on an active payline), a Sports & Leisure query will be given. If this new player instead would prefer a Science & Nature query, he/she may touch the pie wedge symbols on-screen, which then cycle through all possible colors, hence categories, available. The player may stop when all pie wedge symbols are Green, signifying Science & Nature. As such, the player may pre-select Science & Nature and know that when qualified for this bonus game play, he/she will always get a Science & Nature query.

The implementation, as disclosed herein, may include a player pre-selectable trigger symbol for entry into bonus game. However, the trigger symbols themselves need not necessarily change. What is desirable, however, is that the aspect selected by the player be readily apparent to the player.

As another example, consider a game with a Las Vegas theme. As one of the bonus features, the player will play a casino table game. Prior to initiating play on the machine, under the teachings of this disclosure, the player is allowed to select which casino game will be played for the bonus. For example, on-screen the triggering symbol may be a casino chip. In the top right-hand corner of the video screen, the currently selected bonus game may be depicted, e.g., Craps. On the base game screen, by touching either an on-reel casino chip symbol or the currently selected bonus game depicted in the corner, the possible bonus games (e.g., Blackjack, Roulette, Craps, Baccarat, Caribbean Stud) are cycled through. The player simply stops touching the screen when he/she sees the bonus game desired.

Clearly, many other themes and manners of depiction are possible, as will be apparent to skilled artisans. The salient features required are a depiction of the currently selected aspect to the player, and a means for the player to modify this currently selected aspect. The aspect itself may be the entire bonus game (e.g., Blackjack vs. Roulette) or may be a subset of the entire bonus game (e.g., Trivia Sports vs. Trivia Entertainment).

Too, the monetary value and/or difficulty of the bonus game may also be aspects available for the player to choose. Consider a trivia game in which the player may choose both the category and difficulty. For example, as pre-selectable aspects of the bonus game, the player may choose from among "Easy Sports for 50× wager," "Medium Sports for 75× wager," and "Hard Sports for 100× wager." That is, the player may be given an easy question (potentially returning less) or a harder question (possibly paying more). This is player pre-selection. Or, the question may have 3 possible answers and the pre-selectable aspects may be "1 Response for 100× wager" and "2 Responses for 50× wager." In this case, the player will be given a multiple-choice question with three answers, and may pre-select whether to play for more with fewer responses, or play for less with more responses. As still another alternative, the player may be given only one response, but may pre-select the number of possible answers to a multiple-choice question. E.g., the player may choose from "2 Answers for 50× wager," "3 Answers for 75× wager," and "4 Answers for 100× wager."

A player's chance of beating the dealer in a game of Blackjack is a function of the dealer's face up card. As such, alternatively, consider a Blackjack game in which the player may choose "Dealer with 5 face up cards for 100× wager" or "Dealer with Queen face up card for 200× wager." In this manner the difficulty of succeeding in the bonus game is also correlated to its potential monetary value to be won.

Multiple aspects are provided to give the player pre-selection of the nature of the bonus play upon the entry into the bonus game. In this fashion, the player is empowered, a desirable attribute including perhaps control over the subject or even difficulty and/or monetary value of the bonus play and, as will be described more thoroughly, the nature of the play of the casino game.

It is an advantage of the present invention that the player is given distinct meaningful choices, while the outcome is nevertheless controlled in such a fashion as to ensure the operator's house advantage. The casino operator, meanwhile, retains its house advantage that assures a viable casino game. It is required by the regulatory agencies that oversee gaming that the overall house advantage of any slot machine be calculated.

It is a further advantage of the present invention that the improvement described herein has almost no learning curve yet still affords considerable player empowerment and thus replay value.

In a preferred embodiment, the player is offered the choice of a plurality of aspects of bonus play from which to pre-select before the play of the base game. Trigger symbols being those typically aligned or otherwise appearing on the reels are used to signify entry to the bonus play and can be keyed to the pre-selected aspect for reinforcement of the pre-selection and enhancement of the experience and challenge. Herein alignment can take many forms such as disclosed in U.S. Pat. No. 5,580,053 describing many arrangements for multi-line gaming on a plurality of slot reels or a video virtual reel simulation.

The play may include depicting to the player, before play of the base game, information about a plurality of aspects for playing the bonus game. In a preferred embodiment, the step of allowing the player to pre-select one of the plurality of aspects for playing the bonus game occurs before the play of the base game. In practice, it is desirable to have this option available to the player also while the game is idle, or in between games. This is so that a new player may immediately be able to select his/her desired aspects for the bonus games, and then initiate play.

An advantage of this disclosure involves the step of basing the play of the bonus game upon the pre-selected aspect of the bonus game so that the playing of the bonus game may be player customized with a pre-selected aspect. Also possible to include are the following: The method of playing the casino game of chance wherein the step of playing the bonus game includes presenting questions and permitting choices of answers about trivia to the player. The method of playing the casino game of chance with the step of allowing pre-selection of one of a plurality of aspects including the step of choosing one of a plurality of categories for questions. The method of playing the casino game of chance with the step of allowing pre-selection of one of a plurality of aspects might have the step of choosing the difficulty and/or potential monetary value of the questions. The method of playing the casino game of chance with the step of allowing pre-selection also changing at least the triggering symbols required during play of the base game on a slot machine for entry into the bonus game. The method of playing the casino game of chance with the step of allowing pre-selection also changing the symbols to be thematic with the pre-selected aspect of the bonus game. The method of playing the casino game of chance with the step of allowing pre-selection of sets for choosing by the player on the video touch screen of the casino game of chance. The method of playing the casino game of chance with the step of allowing pre-selection having wedges of a circle for the plurality of aspect for choosing by the player. The method of playing the casino game of chance with the step of allowing pre-selection having a menu list wherein the plurality of aspects appear for choosing by the player.

DETAILED DESCRIPTION OF THE INVENTION

Figure 1:
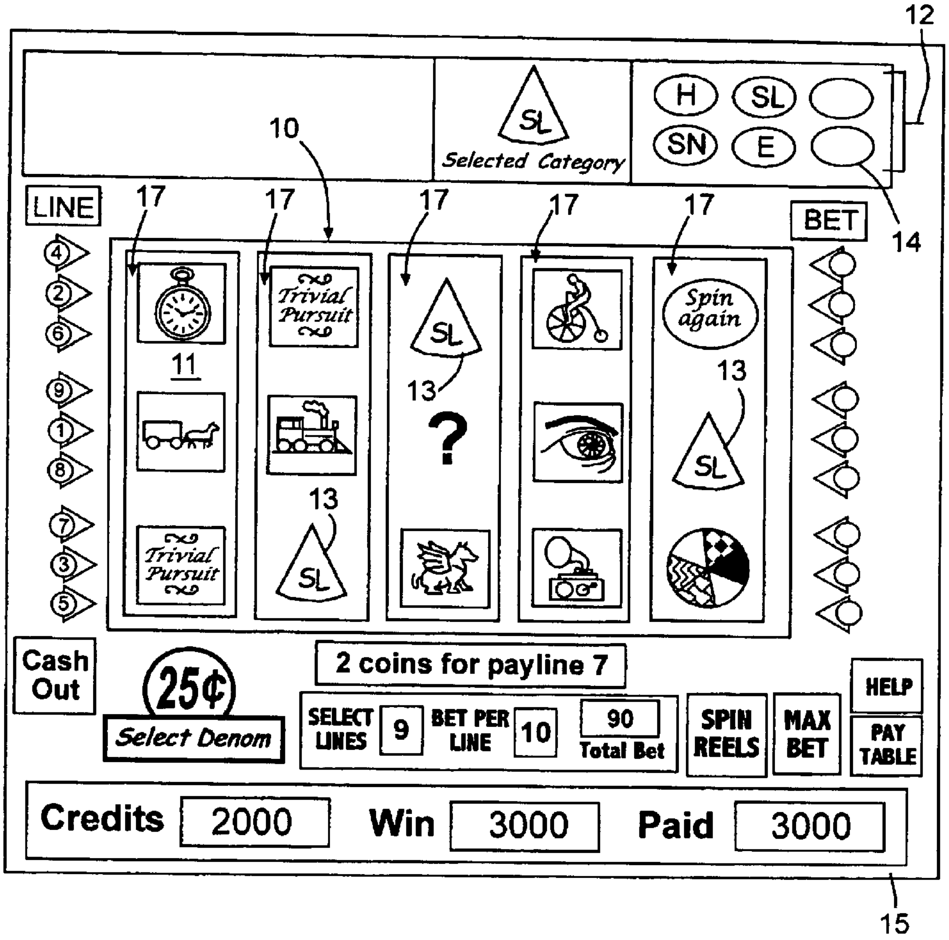
FIG. 1 is front view of a video slot machine for a casino game of chance having the player pre-selectable aspects symbols with one pre-selected for practice of the method.

While the examples illustrating the play and different options for the casino games are explained herein, skilled artisans will appreciate that many variations of the execution of pre-selection of bonus play will be possible. The specific examples presented should not be considered limiting and the particular casino game equipment shown in FIG. 1 is merely for illustration of but one example of form of a video slot machine for a base game and a bonus game played on the same touch screen. U.S. Pat. No. 6,210,279 has a touch screen directly applied; e.g. bonded, to the CRT screen exposed surface so a limited number of push-button actuators control play and select one of several games that can be played on the machine. The player of the game of the video slot machine can use either the touch screen or the push-button actuators to change the playable game elements, such as discarding and drawing new cards when playing poker. The touch screen and associated electronics are arranged and programmed so that multiple touch fields are defined on the surface of the screen by manually touching for playing games, such as keno, which require more actuators than there are push buttons on the machine. Touch fields on screen are identified by appropriately located instruction seen the video display through the transparent touch screen. All the disclosures of the patents cited throughout this disclosure are now made a part hereof and are incorporated by reference.

Figure 2:
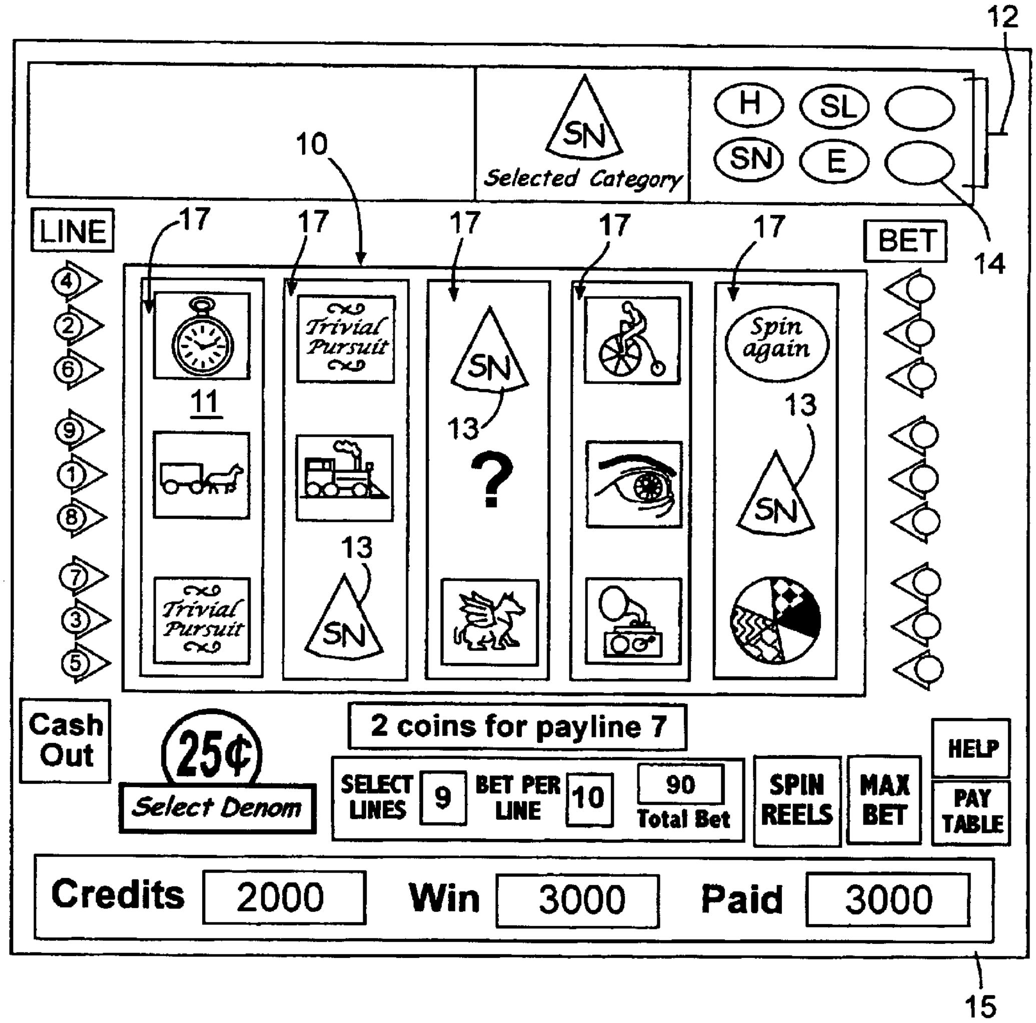
FIG. 2 is front view of a video slot machine for a casino game of chance having the player pre-selectable aspects symbols with another one pre-selected for practice of the method.

A preferred casino game of chance 10 for at least one player is shown in FIGS. 1 and 2. The casino game of chance 10 has a game surface 11 accessible and visible to the player to play the casino game of chance 10. A plurality of player pre-selectable bonus play aspects 12 are shown on the game surface arranged for the players' access to choose the nature of the bonus play be that a category or level of difficulty. Triggering symbols 13 for alignment as entry into bonus play can by computer control be changed to represent the aspect pre-selected by the player. A display 14, for example a menu list, a circle of wedges, or other suitable depiction, presents a plurality of aspects so one may be preferentially pre-selected by the player prior to the outcome of the game. The plurality of player pre-selectable aspects shown at display 14 can be depicted in any the form on a video screen 15. In a known manner in gaming the game surface 11 may be an interactive structure such as a touch screen application on the video screen 15, see FIGS. 1 and 2. If not as the video screen 15, for the purpose of pre-selection or a series of identified controls can in a manner known to, for example, hold cards in a video poker machine can be used. As disclosed throughout the prior patents noted there may be player bonus play entry triggering symbols 12 as part of a particular game.

During play, there is a need to show the currently pre-selected aspect at, for example, display 14 the particular bonus play pre-selected. One form of that could use the bonus entry triggering symbol 13 which may also be representative of the theme of the underlying base game and bonus play. In the preferred embodiment, indicia 17 on the base game can follow the theme of the pre-selected aspect. For example, if the pre-selection were Sports and Leisure as shown in FIG. 1, the indicia 17 on the video reels of the underlying base slot machine might display tennis, baseball, basketball, hockey and football sporting goods on the game surface 11. Thus, the players pre-selection of that aspect as a category of Sports and Leisure would during base game play be reinforced by the reel symbols used during slot play. Upon alignment of say, for instance, tennis rackets entry to the bonus play is achieved, the player would perhaps be presented with a question about tennis and given several answers from which to choose. Preferably one answer of the several presented would be correct and if that were picked by touching display 14 in the appropriate place to choose that answer the player would win the bonus play returning the display 14 to the underlying base game and showing credits won. In the physical embodiments of the casino game of chance 10, the indicia can include graphic representation, icons and video depictions depending on the chosen interactive structure for the casino game of chance 10 and more especially, the aspects pre-selected for the bonus play.

The particular preferred pre-selection mechanism carried on the game surface 11 is position to be visible and available to the player is not critical. The pre-selection mechanism is for choosing the triggering symbol 13 and/or indicia for bonus play aspects is perhaps more a function of the type of casino game of chance 10 than anything else. As set forth herein before, the pre-selection mechanism can include, any interactive structure such as the display 15 having the touch screen, if a video, for the purpose of pre-selection or a series of specifically identified control buttons mounted apart from the display 14.

What is particularly material is the use of player choice to empower the player. Pre-selection of aspect and entry to selected bonus play preferred by and deemed favorable to the player of the casino game of chance 10.

Figure 3:
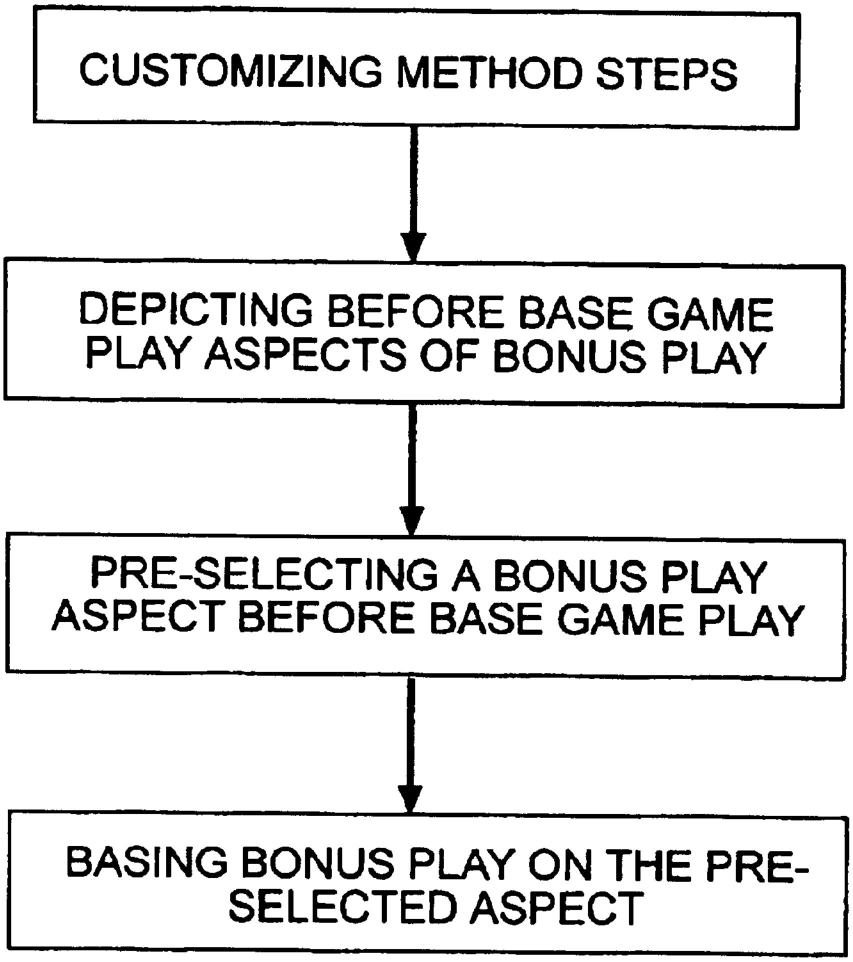
FIG. 3 is a flow diagram of a preferred method of play wherein an aspect of bonus play may be pre-selected.
Figure 4:
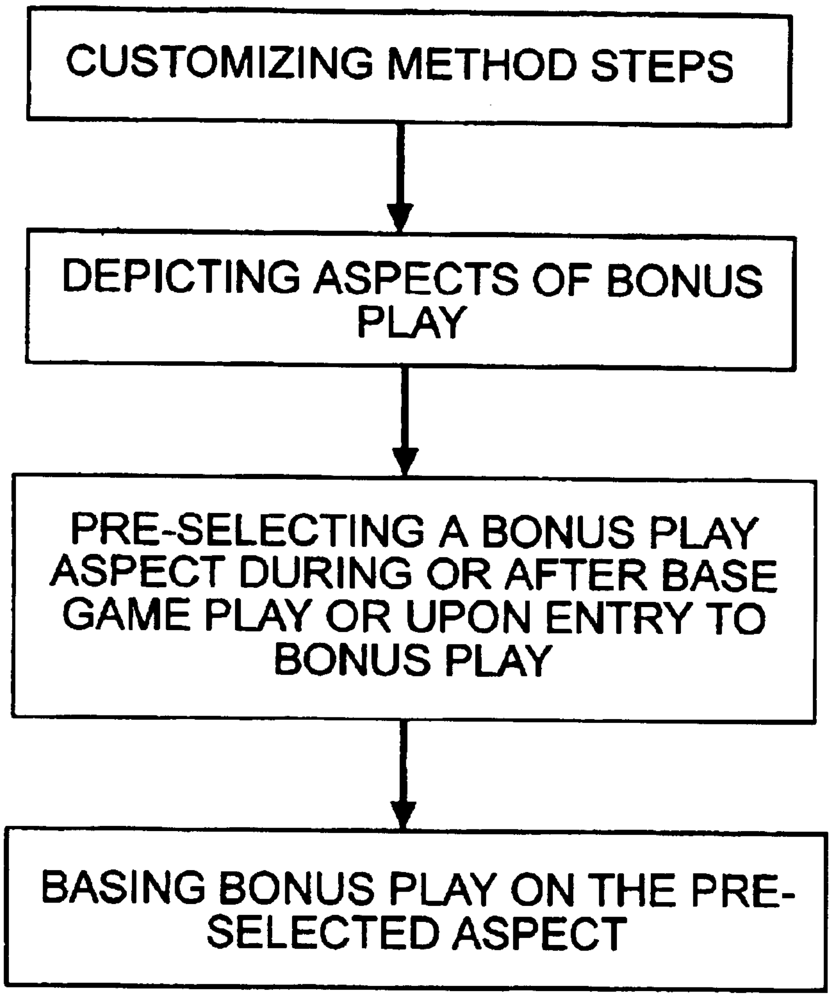
FIG. 4 is a flow diagram of another method of play wherein an aspect of bonus play may be pre-selected.

A method is disclosed for playing a casino game of chance for a bet with random entry from a base game to a bonus game of the casino game of chance as in flow diagrams of FIGS. 3 and 4. The method has the step of depicting to the player, before play of the base game, information about a plurality of aspects for playing the bonus game. Allowing the player to pre-select one of the plurality of aspects for playing the bonus game before play of the base game is a method step in FIG. 3 in particular. Consequently the play of the bonus game is based upon the pre-selected aspect of the bonus game so that the player in accord with the pre-selected aspect customizes the playing of the bonus game.

The method step of playing the bonus game includes presenting questions and permitting choices of answers about trivia to the player. The method step of allowing pre-selection of one of a plurality of aspects includes the step of choosing one of a plurality of categories for questions. The method step of allowing pre-selection of one of a plurality of aspects includes the step of choosing one of a plurality of categories including the difficulty of the questions. The method step of allowing pre-selection includes choosing the aspect based on the player's believed adeptness for answering trivia questions from a group of different categories. The method step of allowing pre-selection also changes at least the triggering symbols required during play of the base game of a slot machine and for entry into the bonus game. The method step of allowing pre-selection also changes the symbols to be thematic with the pre-selected aspect of the bonus game.

The method step of allowing pre-selection of sets for choosing by the player on the video touch screen of the casino game of chance. The method step of allowing pre-selection has wedges of a circle shoeing the plurality of aspect for choosing by the player. The method step of allowing pre-selection has a menu list of the plurality of aspects appear for choosing by the player.

A method for playing a casino game of chance for a bet with random entry from a base game to a bonus game of the casino game of chance has steps of play. In this method the step of depicting to the player information about a plurality of aspects for playing the bonus game happens upon the start of the base game. The player is allowed to then pre-select one of the plurality of aspects for playing the bonus game. The play of the bonus game is based upon the pre-selected aspect of the bonus game so that the playing of the bonus game is pre-customized according to a chosen aspect. The method steps of depicting and allowing occur before play of the base game or occur upon entry to the play of the bonus game.

Another method for playing a casino game of chance for a bet with random entry from a base game to a bonus game of the casino game of chance, the method has the steps of play. In this alternate method depicting to the player information about a plurality of aspects for playing the bonus game happens during or after the base game or upon entry into the bonus game in accord with flow diagram of FIG. 4. The player is allowed to pre-select one of the plurality of aspects for playing the bonus game. The play of the bonus game is based upon the pre-selected aspect of the bonus game so that the playing of the bonus game is customized by the player in accord with the pre-selected aspect. The method steps of depicting and allowing occur during play of the base game. The method steps of depicting and allowing occur upon entry to the play of the bonus game.

The method allows customization of bonus play to include pre-selection of any presented bonus game change that is preferred by the player. When the pre-selection is made or what can be pre-selected should not limit the claims that follow as those details are within the skill of artisans.

What is claimed:

1. A method for controlling at least one aspect of play of a casino game of chance having a base game and a bonus game, the method comprising:

presenting to a player in a display of said casino game of chance, before play of said bonus game, a plurality of options for said bonus game play;

selecting, by the player, at least one of said plurality of presented options;

customizing said bonus game play according to said selected at least one presented option;

playing said bonus game according to said customizing; and modifying at least one triggering symbol displayed during play of said base game in accordance with said selected at least one presented option.

2. The method of claim 1 wherein said customizing comprises:

customizing all of said bonus game play according to said selected at least one option.

3. The method of claim 1 wherein said customizing comprises:

customizing only a subset of said bonus game play according to said selected at least one option.

4. The method of claim 1 wherein said presenting and said selecting occur before said play of the base game.

5. The method of claim 1 wherein said presenting and said selecting occur during said play of the base game.

6. The method of claim 1 wherein said presenting and said selecting occur after said play of the base game.

7. The method of claim 1 wherein said presenting and said selecting occur upon entry into said bonus game.

8. The method of claim 1 wherein said playing comprises:

presenting at least one trivia question to said player; and permitting said player to answer said at least one presented trivia question.

9. The method of claim 1 wherein said selecting comprises:

choosing at least one of a plurality of categories for questions for presentation to said player in said bonus game play.

10. The method of claim 9 wherein said selecting further comprises:

selecting a difficulty level of said questions.

11. The method of claim 1 wherein said modifying comprises:

making said at least one triggering symbol thematic with said selected at least one option.

12. The method of claim 1 wherein said presenting comprises:

depicting a menu list of said options to said player.

13. A method for controlling at least one aspect of play of a casino game of chance having a base game and a bonus game, the method comprising:

presenting to a player in a display of said casino game of chance, before play of said base game, a plurality of options for play of said bonus game;

selecting, by the player, at least one of said plurality of presented options;

customizing said bonus game play according to said selected at least one presented option;

displaying said selected at least one presented option for said bonus game play to said player during said base game play; and wherein said displaying comprises modifying a color of a triggering symbol in accordance with said selected at least one option.

14. The method of claim 13 further comprising:

randomly entering said bonus game from said base game; and playing the bonus game according to said customizing.

15. The method of claim 13 wherein said presenting comprises presenting a plurality of wedges of a circle to said player and wherein said selecting comprises selecting, by the player, at least one of said plurality of wedges.

16. A method for controlling at least one aspect of play of a casino game of chance having a base game and a bonus game, the method comprising:

presenting to a player in a display of said casino game of chance, before play of said base game, a plurality of options for play of said bonus game;

selecting, by the player, at least one of said plurality of presented options for said bonus game play;

displaying said selected at least one presented option for said bonus game play to said player during said base game play;

customizing said bonus game play according to said selected at least one presented option;

randomly entering said bonus game from said base game;

playing said bonus game according to said customizing; and modifying at least one triggering symbol displayed during play of said base game in accordance with said selected at least one presented option.

17. The method of claim 16 wherein said playing comprises:

presenting at least one trivia question to said player; and permitting said player to answer said at least one presented trivia question.

* * * * *